United States Patent [19]

Ahern et al.

[11] Patent Number: 4,864,575
[45] Date of Patent: Sep. 5, 1989

[54] STATIC PERIODIC FIELD DEVICE FOR FREE ELECTRON LASER

[75] Inventors: Brian S. Ahern, Boxboro; David W. Weyburne, Maynard, both of Mass.

[73] Assignee: The United States of America as represented by the Secretary of the Air Force, Washington, D.C.

[21] Appl. No.: 280,607

[22] Filed: Dec. 6, 1988

[51] Int. Cl.$^4$ ............................................. H01S 3/00
[52] U.S. Cl. ......................................... 372/2; 372/37
[58] Field of Search ......................................... 372/2, 37

[56] References Cited

U.S. PATENT DOCUMENTS

| | | | |
|---|---|---|---|
| 3,968,455 | 7/1976 | Yoder | 331/94.5 H |
| 4,145,669 | 3/1979 | Babcock et al. | 331/94.5 PE |
| 4,367,551 | 1/1983 | Gover | 372/2 |
| 4,425,649 | 1/1984 | Elias et al. | 372/2 |
| 4,438,513 | 3/1984 | Elias et al. | 372/2 |
| 4,551,649 | 11/1985 | Olson | 313/336 |
| 4,571,726 | 2/1986 | Wortman et al. | 372/2 |
| 4,599,724 | 7/1986 | McMullin | 372/2 |

*Primary Examiner*—Léon Scott, Jr.
*Attorney, Agent, or Firm*—Stanton E. Collier; Donald J. Singer

[57] ABSTRACT

A static periodic field device for a free electron laser has a plurality of holes therethrough to allow the interaction of electrons flowing therethrough to interact with either an electric or a magnetic fields as desired. The device is composed of a plurality of conducting layers separated by insulating layers and appropriately connected to provide either an electric or a magnetic field therein. The separation of the conducting layers determines the raidated energy wavelength.

4 Claims, 4 Drawing Sheets

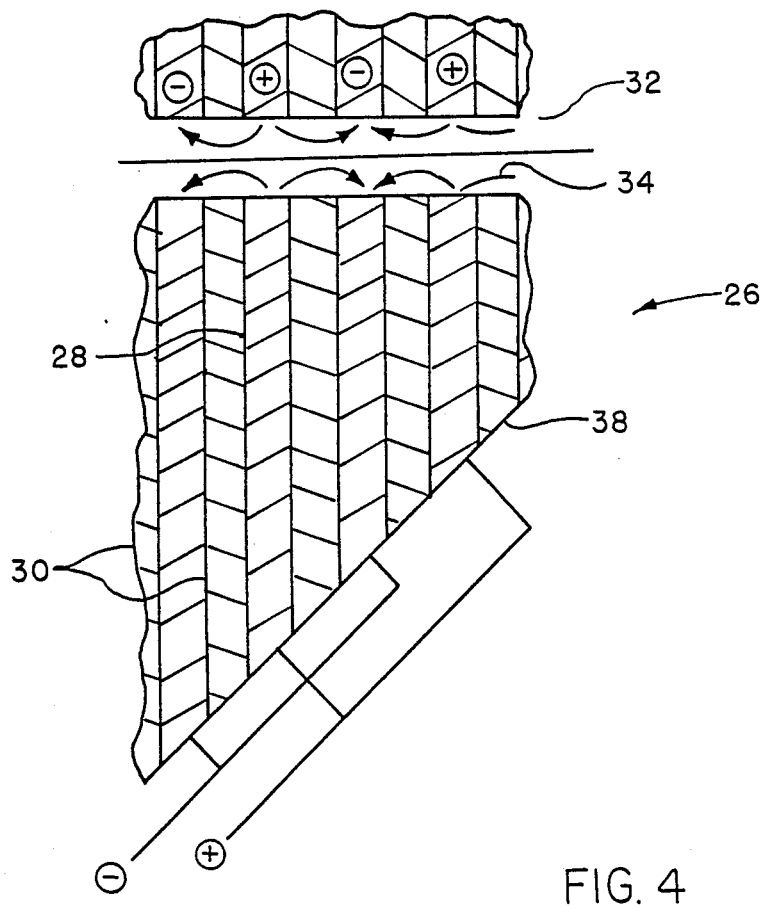
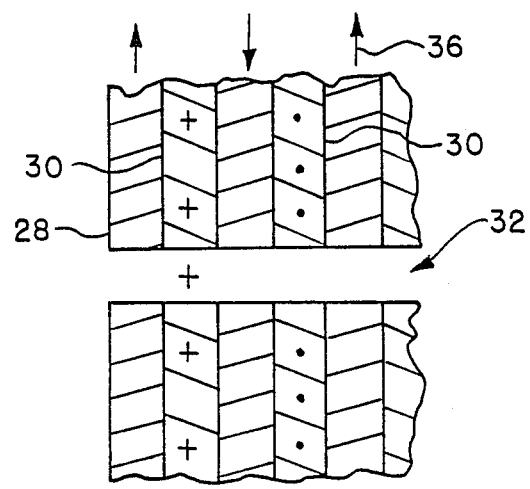

STATIC PERIODIC FIELD DEVICE FOR FREE ELECTRON LASER

STATEMENT OF GOVERNMENT INTEREST

The invention described herein may be manufactured and used by or for the Government for governmental purposes without the payment of any royalty thereon.

BACKGROUND OF THE INVENTION

The present invention relates to lasers, and, in particular, to free electron lasers.

Prior free electron lasers have used transverse static periodic magnetic fields to cause the free electrons to radiate into the laser structure. Such a laser is disclosed in U.S. Pat. No. 4,438,513 and is incorporated by reference herein. As shown therein, an energetic electron beam input along the optical axis of the laser cavity interacts with a periodic magnetic static field and as a result therefrom radiates energy into the optical cavity from which the energy can be extracted. One limitation of such a laser is the use of a single electron beam.

SUMMARY OF THE INVENTION

The present invention provides a device which enables a multitude of electron beams to interact with static periodic electric or magnetic fields.

The static periodic field device consists of a plurality of parallel conducting layers separated by insulating layers. The separation between the layers is of the order of several microns and the number of plates is limited by manufacturing factors but at least several thousand are possible. The device has a plurality of parallel holes perpendicularly positioned with respect to the layers. The electrical connection between the layers provides the means wherein a periodic field is established along the electron path. The static periodic field device may be coupled to an optical cavity for increasing the magnitude of the output beam.

Therefore, one object of the present invention is to provide a static periodic field device for use in a free electron laser.

Another object of the present invention is to provide a static electric periodic field device able to interact with plurality of electron beams therein.

Another object of the present is to provide a static field established device able to interact with a plurality of electron beams therein.

These and many other objects and advantages of the present invention will be readily apparent to one skilled in the pertinent art from the following detailed description of a preferred embodiment of the invention and the related drawings.

BRIEF DESCRIPTION OF THE DRAWINGS

FIG. 3 is a partial cross section of the static electric periodic field device of the invention.

FIG. 4 illustrates by partial cross section the periodic field device creating static periodic magnetic fields.

DETAILED DESCRIPTION OF THE PREFERRED EMBODIMENT

Figure 1:
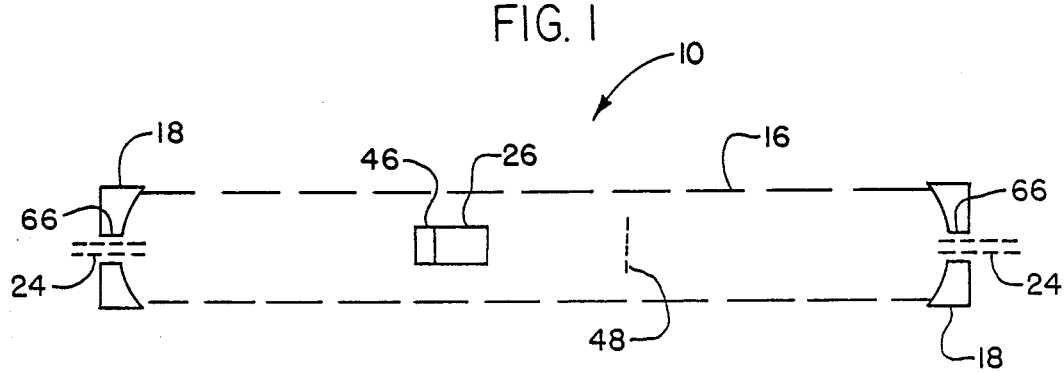
FIG. 1 illustrates by schematic the static periodic field device of the present invention in a laser cavity.

In a free electron laser 10, FIG. 1, electron beams, not shown, generated by an electron source 46 interact in a periodic field device 26. The electrons in the beams interact with the periodic electric field and lose energy in discrete quanta and emit photons as a result. This radiation 16 reflects off mirrors 18 and is extracted from the optical cavity through apertures 66 as output beams 24.

Figure 5:
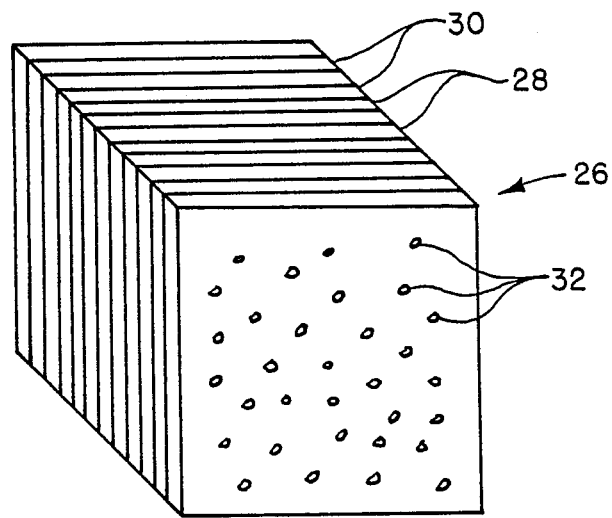
FIG. 5 illustrates the periodic field device before provision of electrical means.

Referring to FIG. 5, the periodic electric field device 26 is shown, partially, in perspective with a plurality of conducting layers 28 separated by insulating layers 30. Further, a multitude of parallel holes 32 pass through layers 28 and 30. Holes 32 are on the order of 25 to 100 microns in diameter. The holes 32 must be sufficiently small so that electrons passing therethrough remain close to the surface of the holes 32 to interact with the periodic magnetic or electric field therein.

For a better understanding, reference is made to FIG. 3 which illustrates by a partial cross section device 26. Conducting layers 28 are separated by insulating layers 30. Hole 32 passes through layers 28 and 30 and the periodic electric field lines 34 are shown in hole 32 and corresponding periodic potential exists therein. A partial cross section showing the periodic magnetic field device is shown in FIG. 4.

As to the static periodic magnetic field device, reference is made to FIG. 4, that illustrates therein opposite current flows by arrows 36 setting up magnetic fields in the insulating layers 30 illustrated by dots and pluses. These fields extend into each hole 32 so that an electron passing therethrough sees periodic static magnetic fields.

In each of the above embodiments, each conducting layer 28 is on the order of about 1000 Å, each insulating layer is on the order of about 1 micron and the spacing between each conducting layer 28 is determined by the application of the lasing energy produced. Energy having a 1 micron wavelength is clearly produceable.

The layers 28 and 30 would be deposited by, for example, chemical vapor deposition (CVD) of super-refractory compounds having either conducting or insulating characteristics. Device 6 thus may have an overall thickness of 1 millimeter to 1 centimeter. Each hole is provided by the chemical removal by preferential dissolution of needles having the desired thickness.

Figure 8:
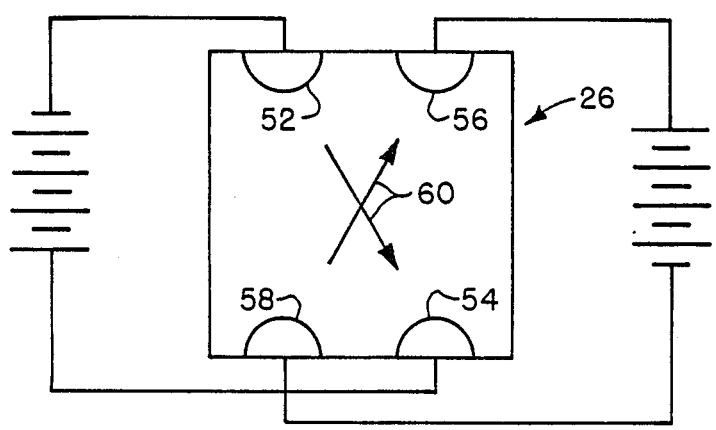
FIG. 8 illustrates the means for causing current flow in FIG. 4.

The connection of device 26 to an appropriate electrical source, voltage or current, is illustrated in either FIG. 3 or FIG. 8.

In FIG. 3, one side of device 26 is beveled to form a mounting surface 38 exposing a larger surface of each layer 28 so that electrical connections can be made to each conducting layer 28.

Figure 6:
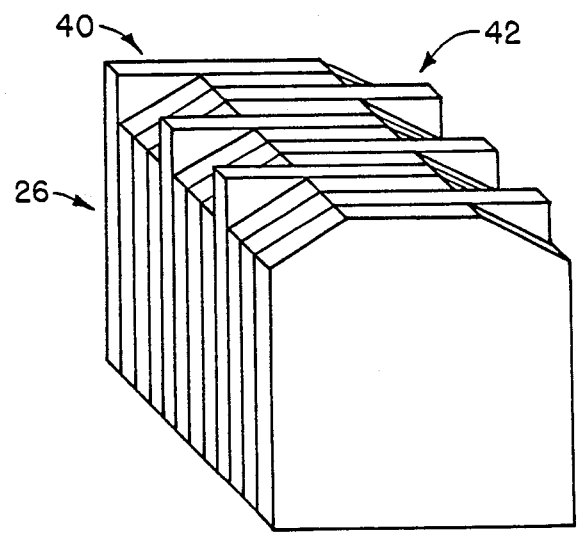
FIG. 6 illustrates the periodic field device having selected areas etched.
Figure 7:
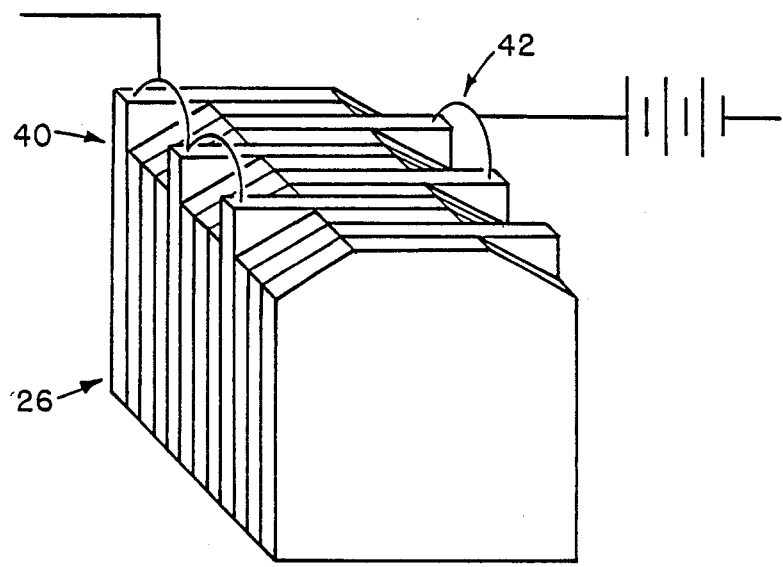
FIG. 7 illustrates the electrical connection of the layers.

An alternative technique is shown in FIGS. 6 and 7. Device 26 is constructed so that each alternate layer 28 is made of a material being dissolvable by a different chemical so that a first area 40 has exposed ever even numbered conducting layer 28 and a second area 42 has exposed ever odd numbered conducting layer 28. Each of the even numbered layers 28 are soldered together and then connected to an electrical source and similarly as to the odd umbered layers as seen in FIG. 7.

Static periodic field device 26, whether providing static electric or magnetic fields, is placed in the optical axis of free electron laser 10 such that a source 46 of electrons is closely associated with device 26 so that a high flux of electrons is presented to the input side of device 26.

Figure 2A:
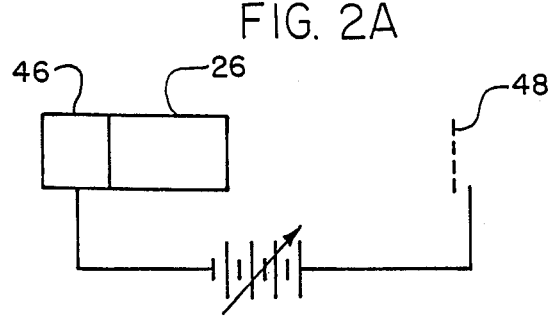
FIG. 2A illustrates by schematic the periodic field device with an electron source with electrical connections thereon.
Figure 2B:
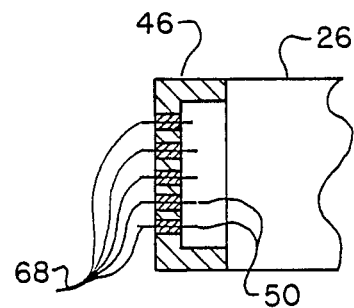
FIG. 2B illustrates by cross section the electron source.

Source 46 may have multiple cold cathodes 50 therein as shown in FIG. 2B. A collector of electrons 48 as shown in FIG. 1 and 2A is placed on the output side of device 26. Collector 48 is sufficiently far away so as not to interfere with output energy 16.

In order to connect the conducting layers 28 for producing magnetic fields as shown in FIG. 4 reference is made to FIG. 6 and FIG. 8. In FIG. 8, device 26 has four areas 52, 54, 56, and 58 preferentially etched such as in FIG. 6, but areas 52 and 54 are either even layers or odd layers and areas 56 and 58 are the opposite of areas 52 and 58. These areas are electrically connected so that current flows as shown by arrows 60.

Clearly, many modifications and variations of the present invention are possible in light of the above teachings and it is therefore understood, that within the inventive scope of the inventive concept, the invention may be practiced otherwise than specifically claimed.

What is claimed is:

1. A static periodic field device for use in a free electron laser said free electron laser having a source of free electrons that are input into said static periodic field device, said static periodic field device comprising:
   a first conducting layer, said first conducting layer having a plurality of holes therethrough;
   a first insulating layer, said first insulating layer being fixedly attached to said first conducting layer, said first insulating layer having a plurality of holes therethrough, said plurality of holes in said first insulating layers being congruent with said plurality of holes in said first conducting layer, said first conducting layer and said first insulating layer comprising a unit of said static periodic field device;
   a plurality of said units being fixedly attached to adjacent units and having congruent holes therethrough, said free electrons flowing into said plurality of holes;
   a last conducting layer, said last conducting layer being fixedly attached to a unit and having congruent holes therethrough, said free electrons flowing through said plurality of holes of said layers and interacting with a periodic field provided in said plurality of holes so as to produce radiant energy of a wavelength equal to multiples of the distance between said conducting layers and
   means for connecting said conducting layers to electrical means, said electrical means providing said periodic field within said plurality of holes so as to interact with said free electrons.

2. A static periodic field device as defined in claim 1 wherein said means for connecting comprises:
   a beveled surface on said static periodic field device, said beveled surface having thereon a plurality of a alternating metal areas and insulating areas, said metal areas being a unitary part of said plurality of conducting layers whereby an electrical connection to each one of said areas provides an electrical path to each one of said conducting layers.

3. A static periodic field device as defined in claim 1 wherein said means for connecting comprises:
   a first area on said static periodic field device having exposed odd numbered conducting layers, said exposed odd numbered conducting layers being electrically connected together, and
   a second area on said static periodic field device having exposed even numbered conducting layers, said exposed even numbered conducting layers being electrically connected together, said areas not overlapping
   whereby a voltage is applied to the even numbered conducting layers connected together and an opposite voltage is applied to the odd numbered conducting layers connected together to provide static electric fields in said holes.

4. A static periodic field service as defined in claim 1 wherein the means for connecting comprises:
   a first area on said static periodic field device having exposed odd numbered conducting layers, said exposed odd numbered conducting layers of said first area being electrically connected together;
   a second area on said static periodic field device having exposed odd numbered conducting layers, said exposed odd numbered conducting layers of said second area being electrically connected together, said first and said second areas being oppositely positioned on said static periodic field device;
   a third area on said static periodic field device said third area having exposed even numbered conducting layers, said exposed even numbered conducting layers, of said third area being electrically connected together;
   a fourth area on said static periodic field device having exposed even numbered conducting layers, said exposed even numbered conducting layers of said fourth area being electrically connected together, said third and said fourth areas being oppositely positioned on said static periodic field device, said areas not overlapping;
   said first area and said fourth areas being proximal and said second area and said third area being proximal,
   whereby a current source is connected to said first area and aid third area, said second area and said forth area having current drains thereon, said areas providing approximately opposite flowing sheets of current to establish alternating magnetic fields in said insulating layers.

* * * * *

UNITED STATES PATENT AND TRADEMARK OFFICE
CERTIFICATE OF CORRECTION

PATENT NO. : 4,864,575

DATED : September 5, 1989

INVENTOR(S) : Brian S. Ahern et al.

It is certified that error appears in the above-identified patent and that said Letters Patent is hereby corrected as shown below:

Title page:

IN THE ABSTRACT

Line 9, delete "raidated" and insert -- radiated --.

IN THE SPECIFICATION

Col. 3, line 4, delete "umbered" and insert -- numbered -- therein.

IN THE CLAIMS

Claim 1, Col. 3, line 33, insert --,-- after first "laser".

In claim 4, Col. 4, line 56 delete "aid" and insert -- said -- therein.

Signed and Sealed this

Eighth Day of January, 1991

Attest:

HARRY F. MANBECK, JR.

*Attesting Officer*  *Commissioner of Patents and Trademarks*